Jan. 8, 1935.  H. F. UNSINGER  1,987,037
MILK BOTTLE CREAM SEPARATOR
Filed Sept. 11, 1933
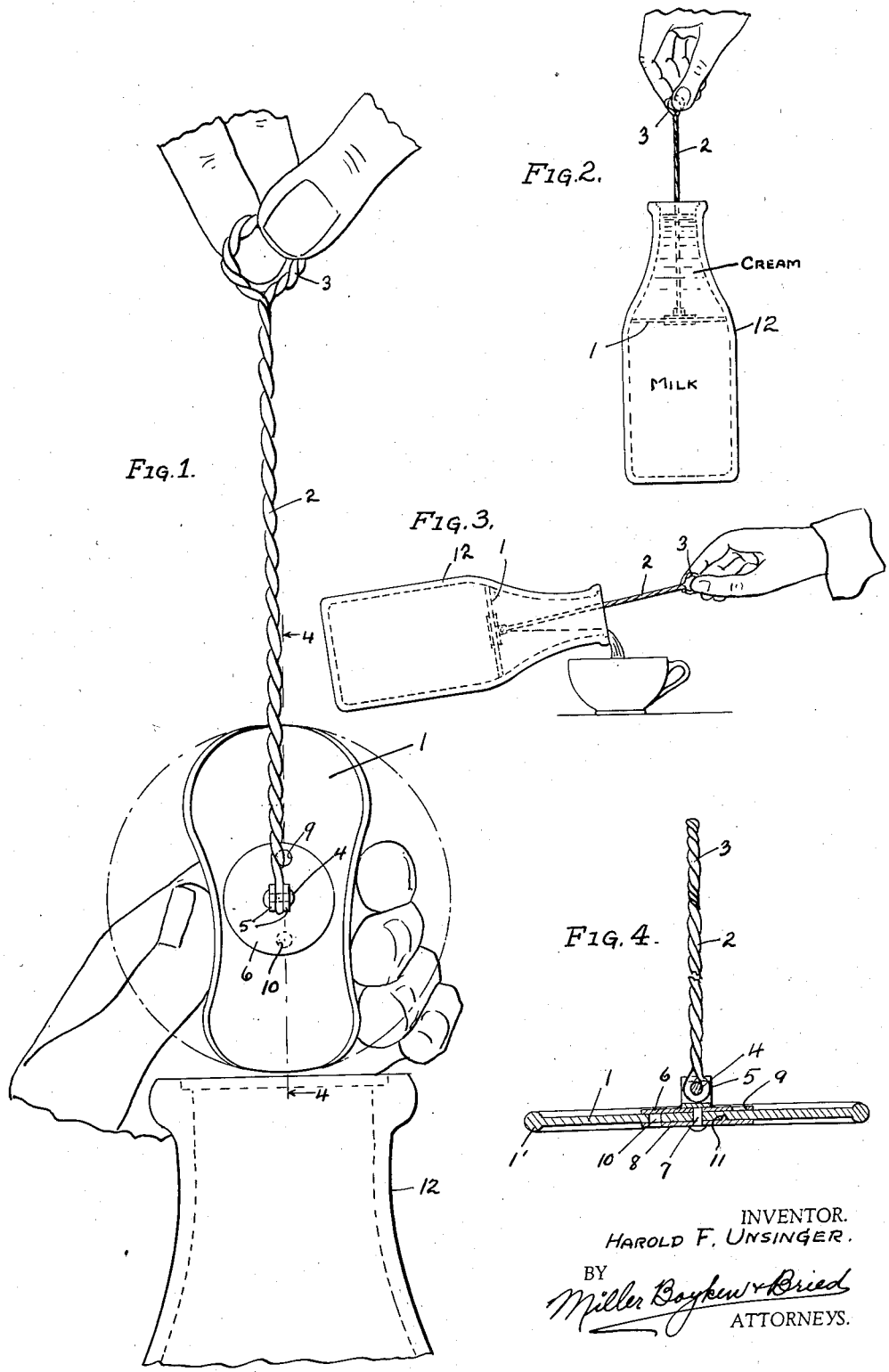
INVENTOR.
HAROLD F. UNSINGER.
BY
Miller Boykin & Bried
ATTORNEYS.

Patented Jan. 8, 1935

1,987,037

UNITED STATES PATENT OFFICE 1,987,037

MILK BOTTLE CREAM SEPARATOR

Harold F. Unsinger, San Francisco, Calif.

Application September 11, 1933, Serial No. 688,867

3 Claims. (Cl. 210—51.5)

This invention relates to improvements in devices for separating the cream from milk in milk bottles, and has for its principal object a simple device which may be inserted into the neck of a milk bottle and permit free decanting of the cream layer without egress of milk. Other objects and advantages of the invention will appear in the following description and accompanying drawing.

In the drawing Fig. 1 is a full size elevation of the device shown compressed with the fingers and in position over the upper end of a milk bottle ready to be inserted.

Fig. 2 shows in reduced scale the milk bottle with the disk of the device turned over and drawn up against the inner walls of the bottle to seal off the cream.

Fig. 3 shows the bottle being emptied of its cream without disturbing the milk.

Fig. 4 is a vertical section taken along the line 4—4 of Fig. 1 and with the wire handle of the device swung to stand perpendicular from the sealing disk.

Briefly described the invention comprises a soft rubber disk provided with a hinged wire handle so arranged that the disk may be turned to lie flat against the handle for insertion into a milk bottle, the disk then pushed through the cream layer, and drawn up snugly against the narrowing neck portion of the bottle just under the cream, so as to permit the cream to be easily poured off without disturbing the milk In the drawing 1 is the soft rubber disk, 2 the wire handle, here shown as a twisted wire, though it may be a single heavy wire, and which handle is preferably provided with a holding loop 3 at its outer end and pivoted at 4 at its inner end to a yoke 5 in turn soldered or otherwise secured to a washer 6 in turn pivoted at 7 to disk 1 by a rivet passing through the disk and secured at its outer end to a circular plate 8 at the opposite side of the rubber disk 1. Washer 6 turns freely upon the rubber disk 1 when the wire handle 2 is twisted and it has a little hole 9 in it adapted to be brought into coincidence with a small hole 10 passing through both disk 1 and plate 8, but plate 8 is prevented from turning by means of a small pin 11 or other projection which may be struck up from plate 8 in a manner to engage the rubber of disk 1.

Disk 1 is of soft rubber preferably with an enlarged outer rim 1', as indicated, and is of a diameter to fit within the neck of a standard milk bottle just at the cream line as indicated in Fig. 2.

Plate 8, washer 6, and yoke 5, as well as rivet 7 and handle 2, are preferably of non-corrodible metal, though other materials may be used if desired.

In use the soft rubber disk is tipped on its pivot 4 until it lies against the wire handle, then it is compressed at opposite edges by the fingers as shown in Fig. 1 and pushed down into the milk bottle 12. The disk descends vertically or edgewise through the cream, then when drawn upward by the handle it will swing to the horizontal and lock against the inner walls of the tapering neck of the bottle so as to effectually seal off the cream as indicated in Fig. 2, and whereupon the bottle may be tipped over as in Fig. 3 to pour out the cream without a drop of milk escaping.

The bottle is then righted and to remove the device the handle is twisted until the air hole coincides with hole 10 (which is readily done by the disk freeing its grip) and whereupon the wire handle may be moved laterally to thereby stand the disk up and make it easy to pull from the bottle edgewise, in the same way as it was inserted.

It is, of course, evident that the device may be used without the air hole 9 but its provision avoids possibility of the milk squirting at the edge of the disk in tipping same for withdrawal.

Having thus described my invention, what I claim is:

1. A milk bottle cream separator comprising a flexible disk of a diameter adapted to fit within the tapering neck of the bottle under the cream, a handle on the disk for holding same up in position to permit the cream to be decanted, the connection of said handle to the disk including a fixed plate on one side of the disk, a washer on the opposite side of the disk pivotally connected through the disk with said plate, a yoke secured to the washer and the handle pivoted to the yoke, the arrangement being such as to permit revolving of the washer by the handle, and an air hole passing through washer, disk and plate.

2. A milk bottle cream separator comprising a flexible disk of a diameter adapted to fit within the tapering neck of the bottle under the cream, a handle on the disk for holding same up in position to permit the cream to be decanted, said disk being adapted to be deformed for inserting edgewise into the bottle and said handle being connected to the disk in a manner to permit the disk to be tipped with respect to the handle, means operated by the handle for opening an air vent from the upper to the lower side of the disk when in position in the bottle.

3. A milk bottle cream separator comprising a flexible disk provided with a handle, said disk being adapted to be deformed for inserting edgewise into the bottle and provided with an air vent communicating with opposite sides thereof, means operated by said handle for opening and closing said vent, said handle being connected to the disk in a manner to permit the disk to be tipped with respect to the handle.

HAROLD F. UNSINGER.